United States Patent
Tartar

(10) Patent No.: US 7,108,821 B2
(45) Date of Patent: Sep. 19, 2006

(54) METHOD FOR MAKING DOUBLE-WALL SHELLS BY CENTRIFUGING

(76) Inventor: Adolphe Tartar, 6 Hameau du Manillet, Merck Saint Lievin (FR) F-62560

( * ) Notice: Subject to any disclaimer, the term of this patent is extended or adjusted under 35 U.S.C. 154(b) by 0 days.

(21) Appl. No.: 10/497,717

(22) PCT Filed: Dec. 10, 2002

(86) PCT No.: PCT/FR02/04248

§ 371 (c)(1), (2), (4) Date: Jun. 4, 2004

(87) PCT Pub. No.: WO03/049927

PCT Pub. Date: Jun. 19, 2003

(65) Prior Publication Data

US 2005/0017410 A1    Jan. 27, 2005

(30) Foreign Application Priority Data

Dec. 10, 2001 (FR) .................................. 01 15905

(51) Int. Cl.
| | |
|---|---|
| B28B 1/40 | (2006.01) |
| B28B 1/34 | (2006.01) |
| B28B 21/32 | (2006.01) |
| B28B 21/22 | (2006.01) |
| B28B 21/48 | (2006.01) |
| B28B 21/56 | (2006.01) |
| B28B 21/80 | (2006.01) |
| F16L 9/02 | (2006.01) |
| F16L 9/12 | (2006.01) |
| F16L 9/18 | (2006.01) |
| F16L 57/02 | (2006.01) |
| F16L 59/125 | (2006.01) |

(52) U.S. Cl. .................. 264/251; 264/270; 264/310; 264/279; 425/517; 425/112; 425/126.1; 138/172; 138/174

(58) Field of Classification Search ............... 264/251, 264/270, 279, 279.1, 311, 310; 425/517, 425/112, 126.1, 435
See application file for complete search history.

(56) References Cited

U.S. PATENT DOCUMENTS 3,783,060 A * 1/1974 Goldsworthy et al. ........ 156/69
3,788,916 A * 1/1974 Gadelius ...................... 156/74
3,816,582 A * 6/1974 Tennyson ................... 264/255

(Continued)

FOREIGN PATENT DOCUMENTS

DE    12 09 728 B    1/1966

(Continued)

Primary Examiner—Michael P. Colaianni
Assistant Examiner—Matthew J. Daniels
(74) Attorney, Agent, or Firm—Merchant & Gould P.C.

(57) ABSTRACT

A method of fabricating a double-walled shell of fiber reinforced plastic material is by centrifuging. The outer wall of the shell is made by projecting glass fibers and resin in a liquid phase against an inside face of a cylindrical mold rotating about its horizontal axis. A section member is then applied against the inside face of the outer wall by a plurality of turns having a diameter substantially equal to the inside diameter of the outer wall and separated from one another by a distance substantially equal to the thickness of the outer wall. The section member has a channel section with a web and two flanges extending radially outward, defining a sealed helical duct. The space between the turns is filled with resin by centrifuging, forming a helical spacer, and the inner wall is formed by centrifuging.

5 Claims, 5 Drawing Sheets

U.S. PATENT DOCUMENTS

| | | | |
|---|---|---|---|
| 4,004,706 A | * | 1/1977 | Guldenfels et al. .......... 220/586 |
| 4,038,001 A | * | 7/1977 | Stinnes ....................... 425/110 |
| 4,071,599 A | * | 1/1978 | Walker ....................... 264/311 |
| 4,611,980 A | * | 9/1986 | Tsuji et al. ................. 425/435 |
| 4,783,232 A | * | 11/1988 | Carbone et al. ............ 156/172 |
| 4,821,915 A | | 4/1989 | Mayer |
| 4,994,132 A | * | 2/1991 | Liekens et al. ............. 156/245 |
| 5,224,621 A | * | 7/1993 | Cannan et al. ........... 220/62.18 |
| 5,829,625 A | * | 11/1998 | Imagawa ................. 220/567.1 |

FOREIGN PATENT DOCUMENTS

| | | | |
|---|---|---|---|
| DE | 26 37 683 A | | 2/1978 |
| EP | 0 760 346 A | | 3/1997 |
| GB | 1065384 A | * | 4/1967 |
| WO | WO 93/07073 A1 | | 4/1993 |

\* cited by examiner

METHOD FOR MAKING DOUBLE-WALL SHELLS BY CENTRIFUGING

FIELD OF THE INVENTION

The invention relates to a method of fabricating double-walled shells of fiber-reinforced plastics material by centrifuging.

DESCRIPTION OF THE PRIOR ART

In the method of fabricating shells by centrifuging, a wall is made by projecting glass fibers and resin in the liquid state against the inside face of a cylindrical mold rotating about its axis, which is horizontal. The method is commonly used for making shells of large dimensions, having lengths that may be as much as 12 meters (m) and diameters that may be as great as 4.2 m. The mold is constituted by two half-shells that are fixed together by bolting in a radial join plane, and it is rotated on a cradle by means of wheels at a speed that may be as high as 50 revolutions per minute (rpm) to 60 rpm. The present method is suitable only for obtaining shells or vessels having a single wall by superposing a plurality of layers of material. The first layer, referred to as gel-coat, serves mainly to facilitate unmolding, and to give a solid color and decent appearance. Furthermore, by adding additives, this layer can serve to protect the vessel from external aggression.

The second layer is the central core of the wall. It is made up of an association of polyester resin and glass fibers. This composite gives the shell the necessary mechanical strength.

The third and last layer is referred to as a "top-coat". Its main characteristic is to give a smooth surface state to ensure that substances stored in the vessel flow properly. It also serves to protect the composite material from being attacked by the stored substance.

In order to make the shell, the element that is to constitute the end wall of the vessel is installed at one end of the mold and becomes secured to the shell once it has been made.

The various ingredients are placed inside the rotating mold by using a telescopic arm lying on the axis of the mold. The arm is deployed over 12 m so as to enable the ingredients needed for obtaining the composite material to be deposited. The resin, which is conveyed by pipes, passes through a tub in order to adjust its pressure before being deposited in the shell.

A grinder installed at the end of the telescopic arm serves to deposit fibers of well-defined length. After depositing the substances and the glass fibers, a system of tamping rollers serves to make the composite more uniform by causing the bubbles of air that are present in the mixture to escape. Molding can thus be performed by projecting reinforced resin into the rotating mold. The resin stays in place because of centrifugal force. In addition, the tamping rollers debubble the resin.

Once the shell has been made, all that remains to be done is to unmold it. For this purpose, the mold is initially opened by moving its two half-shells apart, and then the molded shell is extracted by means of carriages supporting the ends of the shell and traveling parallel to the axis of the mold.

The vessels obtained using such large-dimensioned shells are commonly used for storing grains or chemicals. In this type of storage, the axis of a vessel is vertical.

A need exists to be able to store a variety of substances in underground vessels. Under such circumstances, the vessels are laid horizontally, and their walls must be capable of withstanding considerable loads. Clearly it is possible to increase the thickness of the wall, but that leads to an exorbitant cost for wall material and to a considerable increase in weight.

WO 93/07073 and EP 0 760 346 disclose methods of making vessels having two concentric walls interconnected by spacers. In those two documents, the inner wall is made around a mandrel, and then the spacers and the outer wall are made. In WO 93/07073, a ribbed foam is applied on the inner wall prior to making the spacers by depositing resin and glass fibers. In EP 0 760 346, a ribbed casing is deposited on the outside face of the inner wall, thereby forming cavities around the inner wall, followed by a cylindrical casing so that the resin constituting the outer wall does not fill the grooves.

BRIEF SUMMARY OF THE INVENTION

The object of the invention is to propose a method of fabricating double-walled shells in which all of the plastics material is deposited by centrifuging.

The invention thus relates to a method of fabricating double-walled shells of fiber reinforced plastic material by centrifuging, in which method the outer wall is made by projecting glass fibers and resin in the liquid phase against the inside face of a cylindrical mold rotating about its axis, which is horizontal.

The method of the invention is characterized by the fact that after the outer wall of the shell has been made, a metal section member constituted by a plurality of turns having a diameter substantially equal to the inside diameter of the outer wall and separated from one another by a distance substantially equal to the thickness of the outer wall is applied against the inside face of said outer wall, said section member having a channel section with a web and two flanges extending radially outwards, with their free edges penetrating into the material constituting said outer wall so as to define a helical duct that is sealed and that extends from one end to the other of said shell, after which the inter-turn space is filled with the resin by the centrifuging method in order to form a helical spacer, and the inner wall is made by the centrifuging method.

Thus, in the method of the invention, the material constituting the shell is a homogeneous composite. The gel-coat layer is initially deposited on the inside face of the mold and the top-coat layer is deposited on the inside face of the composite outer wall.

Most advantageously, the metal section member is applied against the inside face of the outer wall by causing the mold to turn about its axis of rotation while the curved section member is being pressed against said face, said section member being delivered continuously and in appropriate quantity substantially tangentially to said inside face, by a device for fabricating a curved section member from a metal strip, and by displacing said device and said mold axially relative to each other while the section member is being applied as a function of the speed of rotation of the mold.

Preferably, the delivered curved section member is pressed by means of presser wheels carried by the fabrication device.

The invention also provides an installation for implementing the method.

The installation comprises:

a cylindrical mold suitable for turning about its axis, which is horizontal;

a fabrication device for fabricating a curved channel section member, the device comprising from upstream to downstream:

a metal-strip dispenser;

means for conveying and guiding the metal strip delivered by the dispenser;

means for forming a rectilinear channel section member from the metal strip;

means for curving the channel section member;

means for pressing the curved section member against the inside face of the outer wall; and drive means for driving the transport means, the forming means, and the curving means; and means for displacing said fabrication device axially relative to the mold, and control means for controlling said drive means and said axial displacement means synchronously with the speed of rotation of the mold.

Preferably, the forming means comprise at least three pairs of forming wheels disposed substantially perpendicularly to the axis of rotation of the mold.

Advantageously, the curving means comprise a pair of stationary guide wheels for holding the channel section member and preventing the curving force being transferred to the forming means, and two curving wheels disposed on either side of the web of said section member and offset in the travel direction of the section member, said curving wheels being adjustable perpendicular to the travel direction of said section member in order to deliver a curved section member having a predetermined radius of curvature, the section member being delivered substantially tangentially to the inside face of the outer wall.

BRIEF DESCRIPTION OF THE DRAWINGS

Other advantages and characteristics of the invention appear on reading the following description made by way of example and with reference to the accompanying drawings, in which:

FIGS. 1 and 2 show a conventional installation 1 for making a single-walled shell in accordance with the prior art.

DETAILED DESCRIPTION FO THE INVENTION

Figure 1:
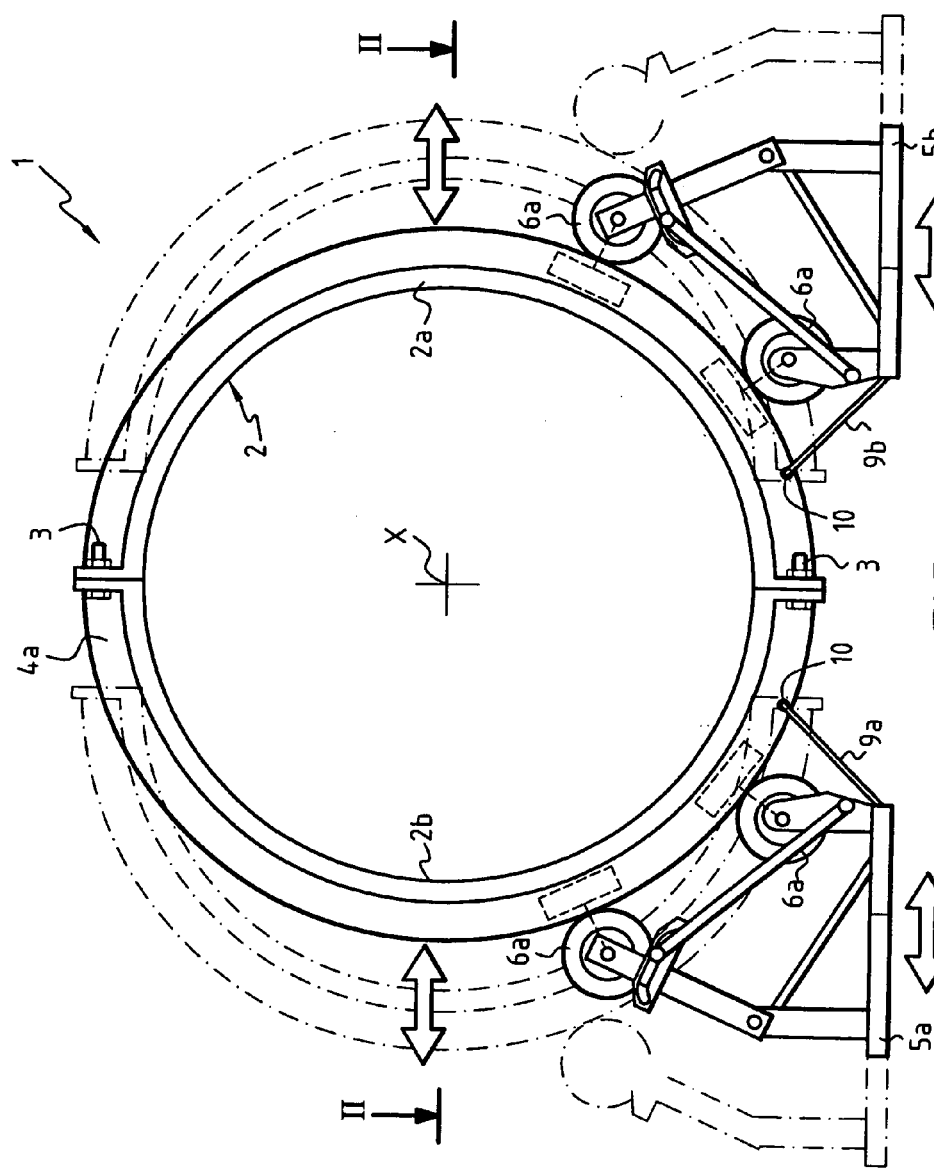
FIG. 1 is an end view of a mold used for making a shell by centrifuging, together with its support and means for driving the mold in rotation.
Figure 2:
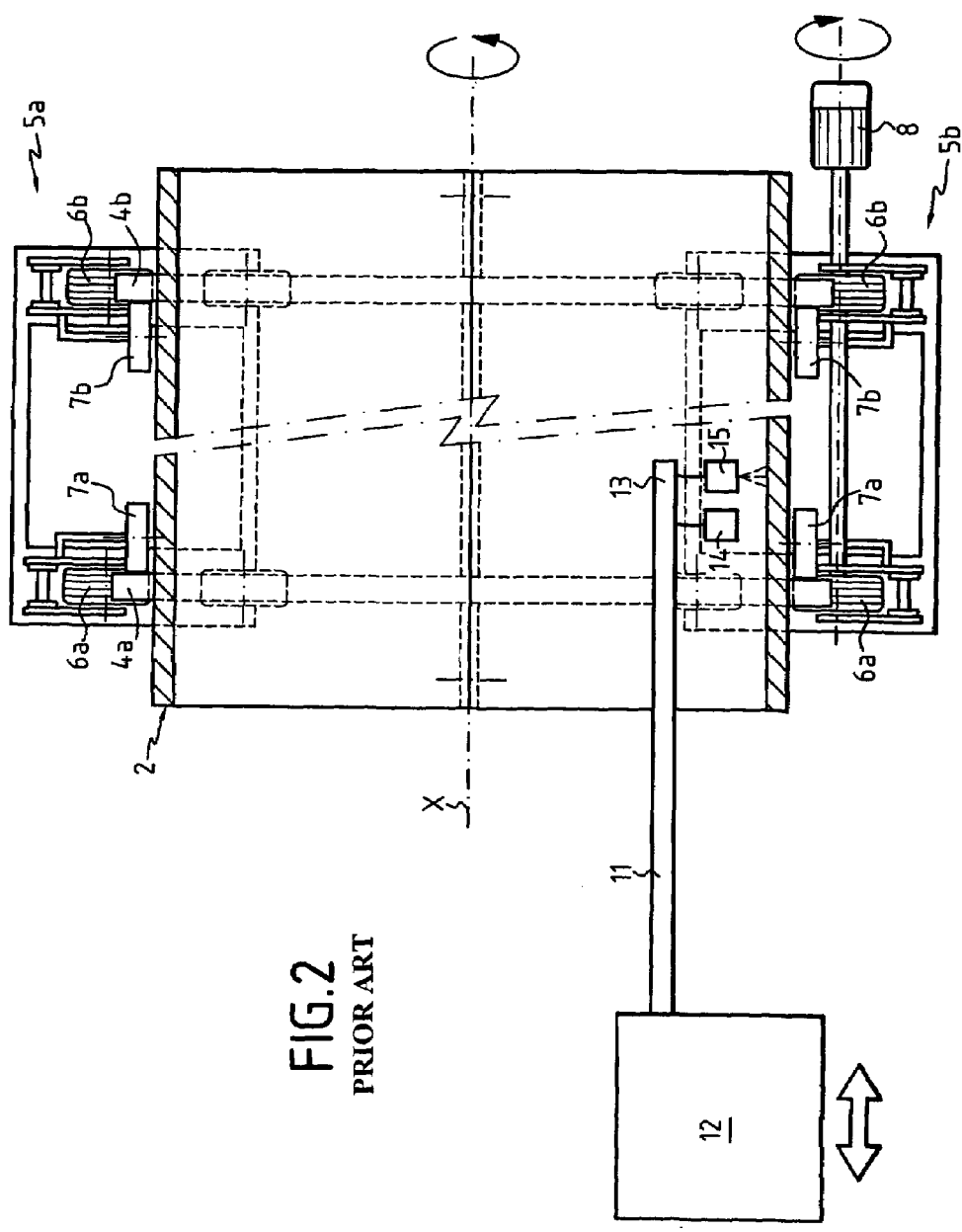
FIG. 2 is a section on line II—II of FIG. 1.

The installation 1 essentially comprises a cylindrical mold 2 made up of two half-shells 2a, 2b that are separable on a midplane containing the horizontal axis X of the mold and that are suitable for being connected together by bolts 3. The mold 2 presents rings 4a, 4b at its periphery that are used for driving it in rotation. The mold 2 rests on two side cradles 5a, 5b which present pairs of front and rear wheels 6a and 6b on common axes, with the rings 4a and 4b resting thereon. The cradles 5a and 5b also carry wheels 7a and 7b on axes that are perpendicular to the axes of the wheels 6a and 6b and that run on the flanks of the rings 4a and 4b so as to prevent the mold 2 from moving axially. Two wheels 6a and 6b of the cradle 5b, for example, are driven by a motor 8, thereby driving the mold 2 in rotation, and also causing the six other wheels 6a, 6b and the wheels 7a, 7b to rotate.

The two cradles 5a and 5b can be spaced apart from each other by actuators, e.g. in order to enable unmolding to be performed by opening the mold 2 after removing the bolts 3, the join plane then being vertical, and the bottom edges of the two half-shells 2a and 2b then being connected to the cradles 5a and 5b by cables 9a and 9b fixed to hooks 10 on each of said half-shells 2a, 2b.

To mold a shell, the two half-shells 2a and 2b of the mold are moved towards each other by moving the cradles 5a and 5b towards each other, they are then bolted together and the cables 9a and 9b are unhooked. Switching on the motor 8 causes the mold 2 to rotate.

The installation 1 also has a telescopic arm 11 mounted on a structure 12 outside the mold 2. The end 13 of the telescopic arm can be moved parallel to the axis X. This end carries a grinder 14 for grinding glass fibers and a tub 15 for receiving a resin in liquid form. In operation, the glass fibers and the resin are sprayed against the inside wall of the rotating mold. The liquid resin remains against the wall of the mold because of centrifugal force. To build up a given thickness of wall, the end 13 of the telescopic arm is moved back and forth over the entire length of the mold 2.

Figure 3:
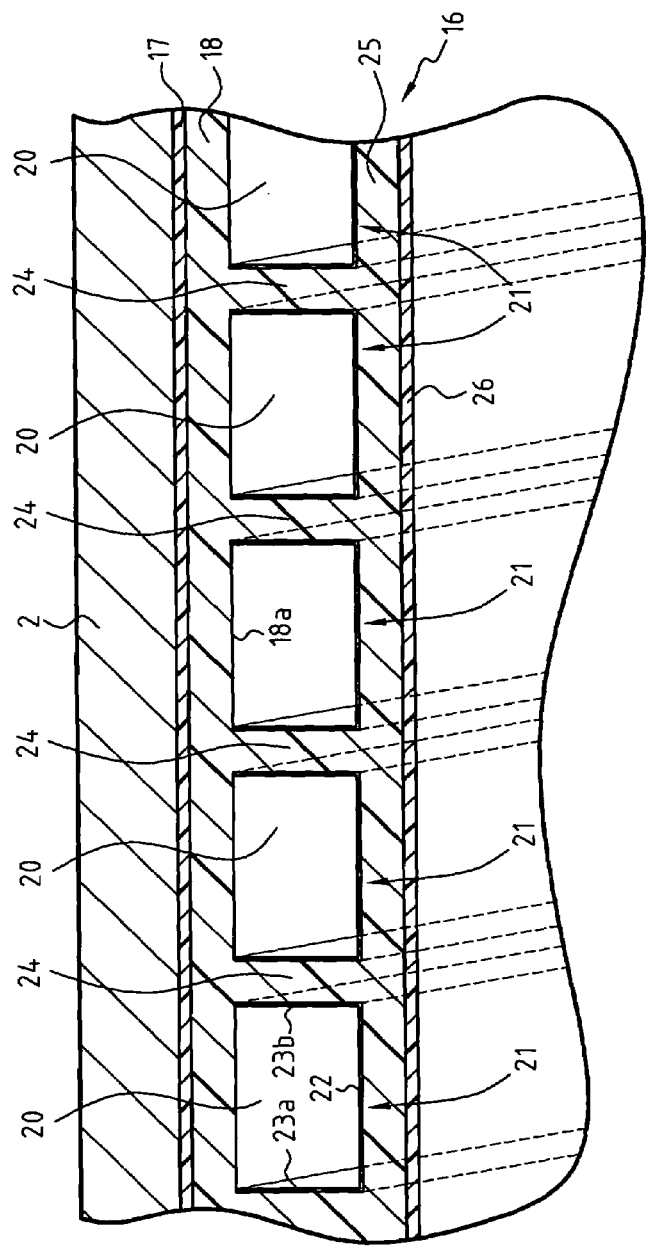
FIG. 3 is a section on a radial plane through the mold and the shell made by the method of the invention.

FIG. 3 shows the structure of the shell 16 that is obtained by the invention:

the shell 16 presents from the outside towards the inside:

a) an outer layer 17 of gel-coat deposited by the known centrifuging method;

b) an outer wall 18 of composite material, glass fiber reinforced polyester resin, said layer being deposited by the known centrifuging method described above in the present text;

c) a bonding zone comprising firstly a helical empty space 20 defined by the inside face 18a of the outer wall 18 and the inside face of a curved channel section member 21 having a web 22 and two flanges 23a and 23b which extend radially outwards and whose edges bear in leaktight manner against the inside face 18a of the outer wall 18, said curved section member 21 comprising a plurality of turns extending from one end to the other of the shell 16, and also comprising a helical spacer 24 filling the gap between the turns of the curved section member 21, and made of polyester resin possibly filled with glass fibers by the centrifuging method;

d) an inner wall 25 of composite material, glass fiber reinforced polyester resin, deposited by the centrifuging method; and e) an inner layer 26 of top-coat deposited by the centrifuging method.

The walls 18 and 25 are 7 millimeters (mm) thick, for example, and the thickness of the helical spacer 24 in the axial direction of the mold 2 is 7 mm, for example.

The web 22 of the curved section member 21 is 30 mm wide, for example and the flanges 23a and 23b extend radially over 20 mm. With these dimensions, the volume of the empty helical space 20 is substantially equal to half the volume of the shell 16.

In the method of the invention, after depositing the outer wall 18, removing bubbles from said wall, and allowing it to polymerize at least in part, the curved channel section member 21 is applied against the inside face 18a of the outer wall 18 and the helical space between the turns is filled with polyester resin possibly filled with glass fibers, so as to make the helical spacer 24 which is allowed to polymerize at least in part prior to making the inner wall 25 and the top-coat layer 26.

Figure 4:
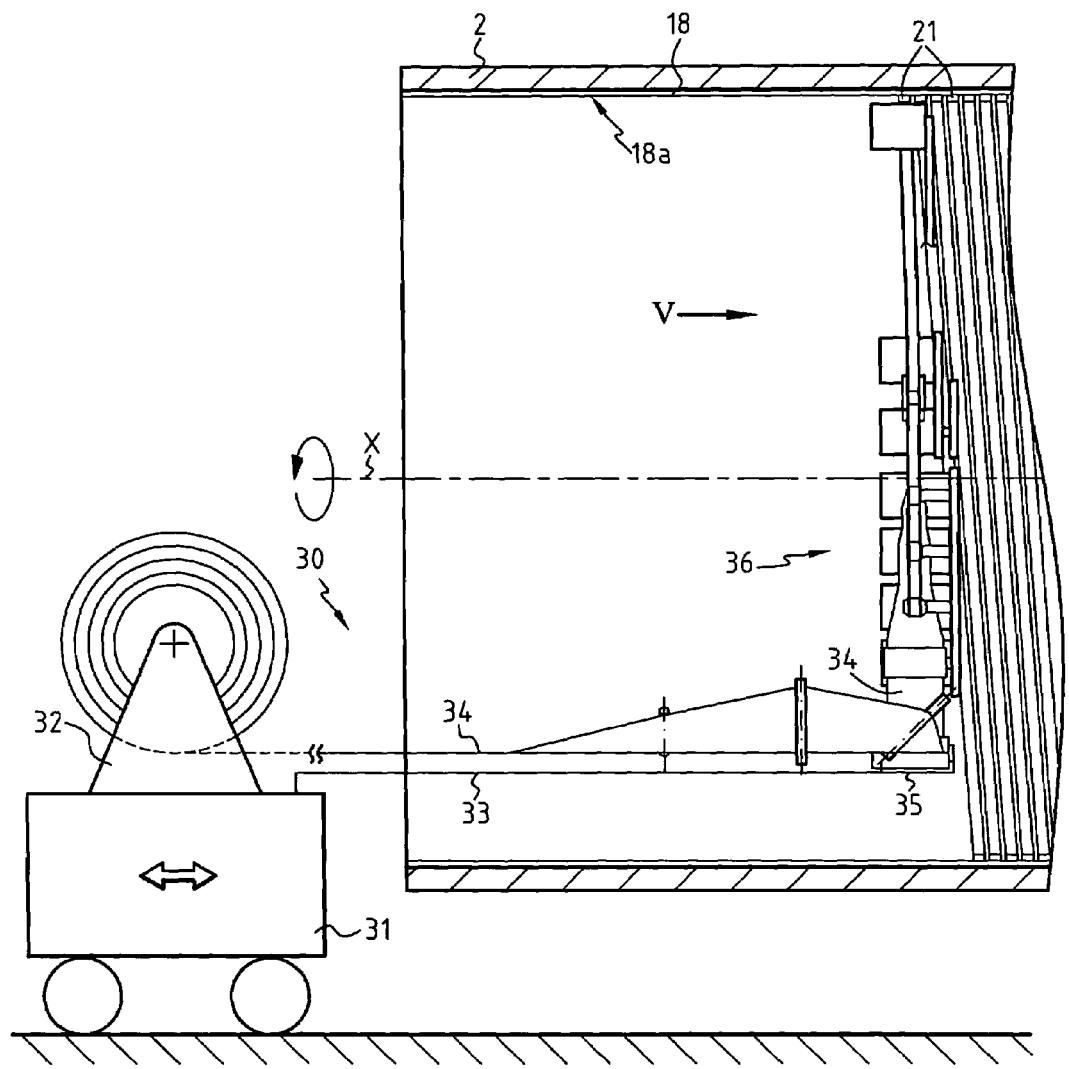
FIG. 4 is a side view of the installation showing an example of the device for making a curved channel section member.
Figure 5:
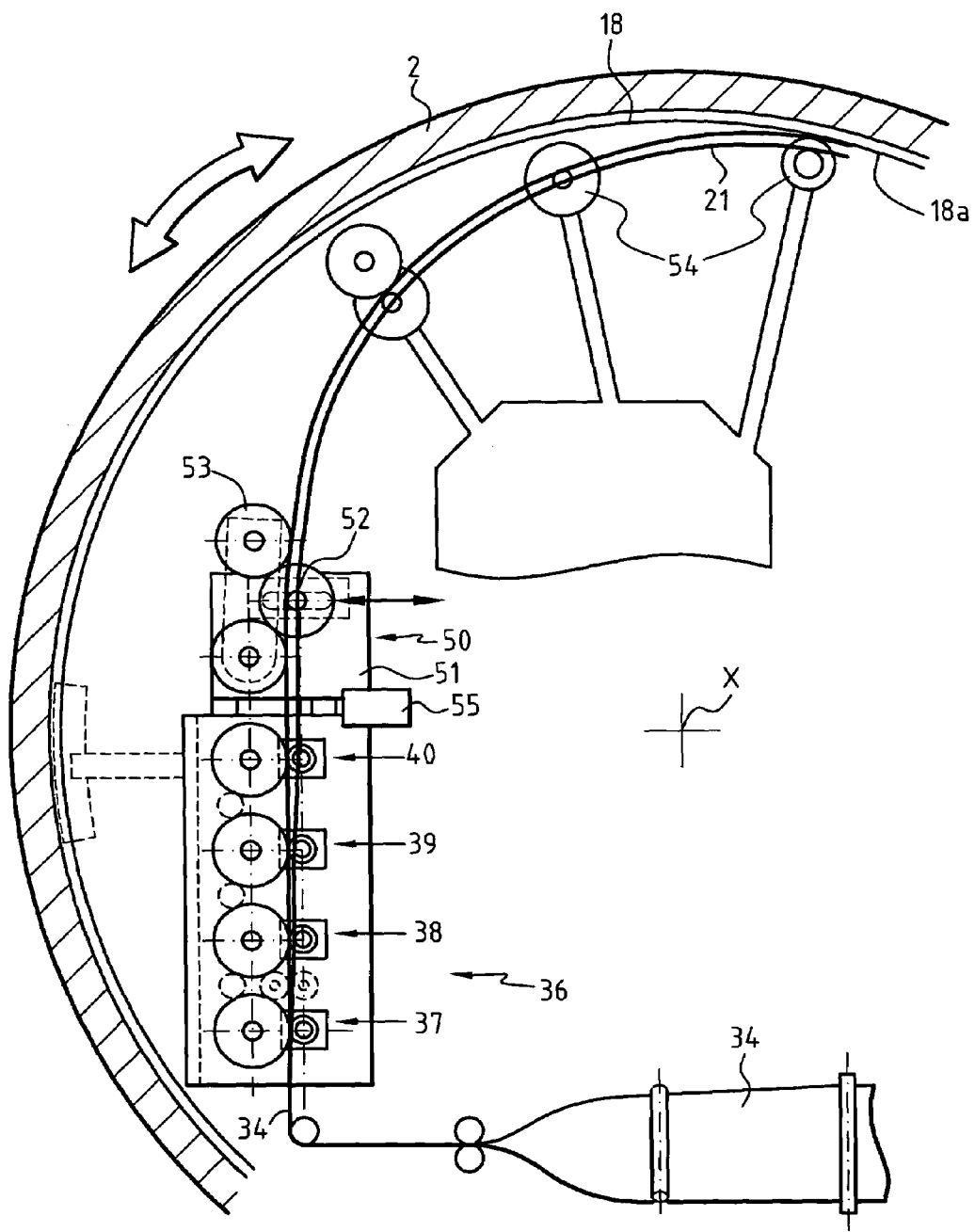
FIG. 5 is an end view of the device for making a curved channel section member.

FIGS. 4 and 5 show a device 30 for making and laying the curved channel section member 21 as described above against the inside face 18a of the inner wall 18.

The device 30 comprises a structure 31, possibly mounted on rails, which is disposed outside the mold 2 and which supports a reel 32 of metal strip and a rigid rod 33 or telescopic arm disposed parallel to the axis X of the mold 2. The rod 33 includes means for transporting and guiding the metal strip 34 towards the end 35 of the rod 33.

The end 35 of the rod 33 carries means for changing the travel direction of the metal strip 34, so as to enable a device 36 for continuously fabricating the curved section member 21 to be fed continuously with the metal strip 34, said device 36 being carried by the end 35 of the rod 33.

The device 36 essentially comprises four aligned pairs of wheels on axes parallel to the axis X of the mold, serving to convert the metal strip 34 into a rectilinear channel section member of flanges that extend towards the closest zone of the mold wall and whose path is perpendicular to the axis X. The first pair of wheels 37 enables the metal strip 34 to be guided accurately. The second pair of wheels 38 folds the edges of the metal strip to a 30° position, the third pair of wheels 39 folds them to a 60° position, and the fourth pair of wheels 40 folds them to a 90° position.

Downstream from the four pairs of wheels 36, 38, 39, and 40, in the travel direction of the metal strip 34, there is provided a device 50 for adjustably curving the section member, which device comprises a first pair of wheels 51, that are stationary, for guiding the rectilinear channel section member, a first curving wheel 52 bearing against the outside face of the web 22 of the section member 21, and a second curving wheel 53 bearing against the inside face of the web 22 of the section member 21 and situated downstream from the first curving wheel 52.

The two curving wheels 52 and 53 are movable and adjustable in a direction substantially perpendicular to the travel path followed by the section member 21 so as to enable the radius of curvature of the resulting curved section member 21 to be adjusted as a function of the radius of the mold 2, and so as to enable the curved section member 21 leaving the curving device 50 to come substantially tangentially into contact with the inside face 18a of the outer wall 18. On leaving the curving device 50, there are wheels 54 which enable the channel section member 21 to be pressed against the inside face 18a of the outer wall 18 so that the edges of the flanges 23a and 23b penetrate far enough into the outer wall 18 to ensure that the helical cavity 20 is sealed sufficiently to prevent the liquid resin that will subsequently fill the gap between the turns from penetrating into said helical cavity 20.

In practice, the radius of curvature of the curved section member leaving the curving device 50 is smaller than the radius of curvature of the outer wall 18, and the wheels 54 have a second function of straightening the curved section member 21 out somewhat.

The various wheels of the device 36 for preparing the curved section member 21 are rotated by a motor 55 operating synchronously with the speed of rotation of the mold 2 so as to deliver the curved section member 21 as a function of requirements. The torque delivered by the motor 55 is preferably sufficient to ensure that the delivered section member presses positively against the inside face 18a of the outer wall 18.

While the section member is being put into place, the end 35 of the rod 33 is also moved parallel to the axis X relative to the mold 2 in proportion to the speed of rotation of the mold 2 so that the distance between turns is constant. This linear displacement can be implemented by means of a motor acting on the length of the rod 33, if it comprises a telescopic arm, or causing the structure 31 to move axially if it is mounted on rails, or causing the cradles 5a and 5b supporting the mold 2 to move axially.

Synchronization is advantageously achieved by means of a device for controlling the various motors that receives signals from an angle encoder associated with the mold 2.

The invention claimed is:

1. A method of fabricating a double-walled shell of fiber reinforced plastic material by centrifuging, wherein the double-walled shell has an outer wall having a thickness, an inside face, and an inside diameter, the method comprising:
   projecting glass fibers and resin in a liquid phase against an inside face of a cylindrical mold rotating about its horizontal axis, forming the outer wall,
   applying a curved metal section member against the inside face of the outer wall with a device for fabricating curved section members from a metal strip, wherein the metal strip is pressed against the inside face of the outer wall and the mold is rotated about its horizontal axis forming a plurality of turns having a diameter substantially equal to the inside diameter of the outer wall and separated from one another by a distance substantially equal to the thickness of the outer wall, said section member defining a channel section, wherein said channel section has a web and two flanges extending radially outward having free edges wherein said free edges penetrate said outer wall, defining a sealed helical duct extending from one end of said shell to the other end of said shell, and wherein the distance between the turns defines a space,
   filling in the space between the turns with resin by centrifuging, forming a helical spacer, and
   forming the inner wall by centrifuging,
   wherein said section member is applied continuously and substantially tangentially to said inside face and is formed as a function of the speed of rotation of the mold, and
   wherein said device and said mold are displaced axially relative to each other.

2. The method of claim 1, wherein the curved section member is pressed by presser wheels carried by the fabrication device.

3. An installation for implementing a method of fabricating a double-walled shell of fiber reinforced plastic material by centrifuging, comprising:
   a cylindrical mold for turning about its horizontal axis;
   a fabrication device for fabricating a curved channel section member, the device comprising from upstream to downstream:
      a metal-strip dispenser delivering a metal strip;
      means for transporting and guiding the metal strip delivered by the dispenser;
      means for forming a rectilinear channel section member from the metal strip;
      means for curving the channel section member;
      means for pressing the curved section member against an inside face of an outer wall of a fiber reinforced plastic layer deposited on an inside face of the cylindrical mold;
      drive means for driving the transport means, the forming means, and the curving means;
   means for displacing said fabrication device axially relative to the mold, and a synchronization device which synchronizes said drive means and said axial displacement means with speed of rotation of the mold.

4. The installation of claim 3, wherein the forming means comprise at least three pairs of forming wheels disposed substantially perpendicular to the axis of rotation of the mold.

5. The installation of claim 4, wherein the curving means comprise:
a pair of stationary guide wheels for holding the channel section member and for preventing the transfer of the curving force to the forming means, and
two curving wheels disposed on either side of the web of said section member and offset in the travel direction of the section member, wherein said curving wheels are perpendicularly adjustable relative to the travel direction of said section member and deliver a curved section member having a predetermined radius of curvature, and wherein the section member is delivered substantially tangential to the inside face of the outer wall.

* * * * *